April 1, 1947.   J. M. MAVITY   2,418,419
METAL HALIDE CATALYSIS OF HYDROCARBONS
Filed Aug. 31, 1944
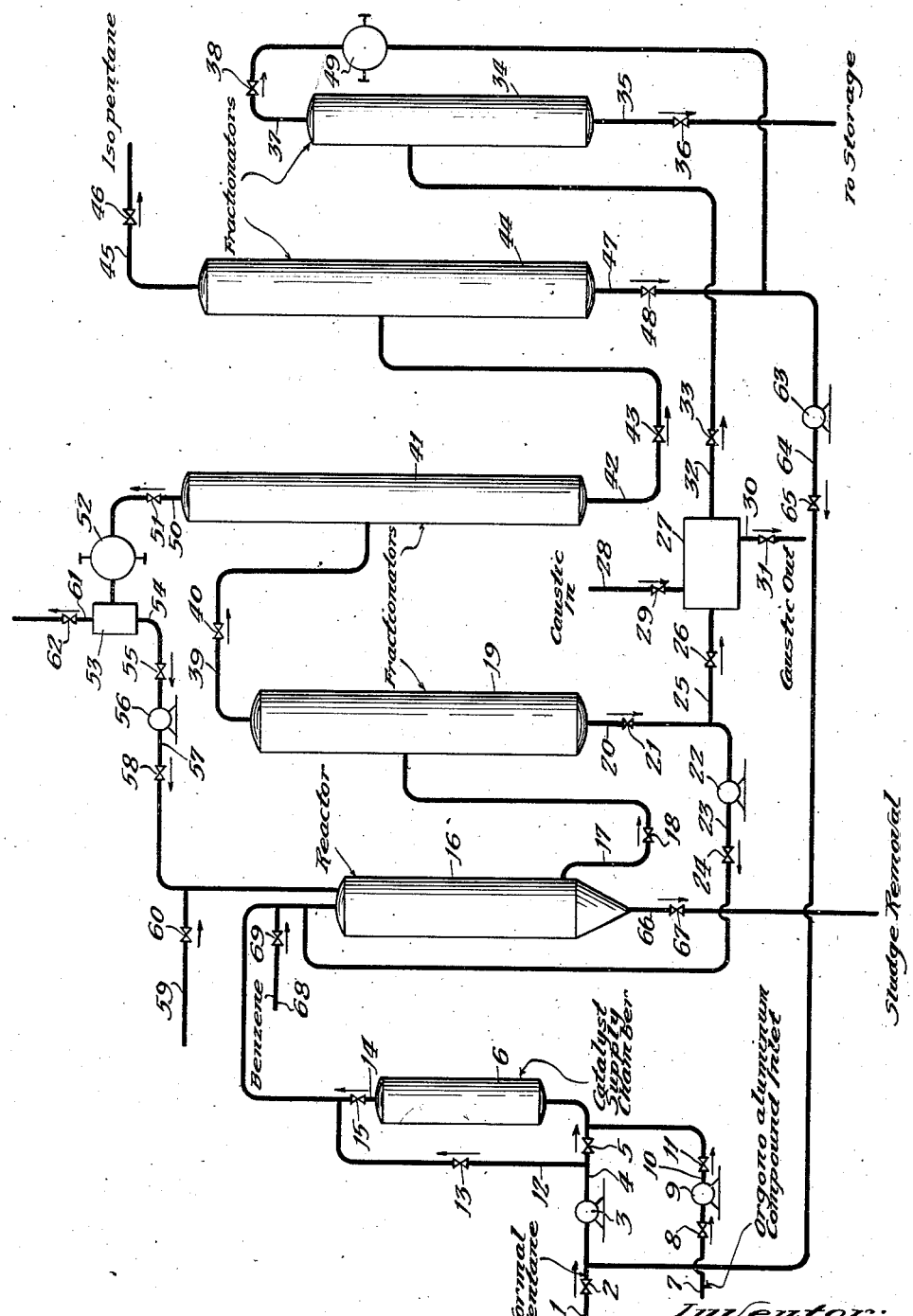
Inventor:
Julian M. Mavity
By: Lee J. Gary
Attorney Patented Apr. 1, 1947

2,418,419

UNITED STATES PATENT OFFICE 2,418,419

METAL HALIDE CATALYSIS OF HYDROCARBONS

Julian M. Mavity, Riverside, Ill., assignor to Universal Oil Products Company, Chicago, Ill., a corporation of Delaware Application August 31, 1944, Serial No. 552,155

9 Claims. (Cl. 260—683.4)

This invention relates to an improved method for effecting organic chemical reactions which utilize the Friedel-Crafts type metal halide catalyst. More specifically, it is directed to improvements in a process wherein a small amount of the Friedel-Crafts metal halide catalyst is introduced in the reaction zone by continuously or intermittently passing the hydrocarbon charge in liquid phase through a bulk supply zone of the catalyst.

Friedel-Crafts type metal halide catalysts, particularly aluminum chloride, are extremely effective in the catalysis of various organic reactions and are especially useful in the alkylation, isomerization and cracking of hydrocarbons. However, because of the high catalytic activity the selectivity of the catalyst is to some extent impaired. This is particularly true if an excessive amount of catalyst is maintained in the reaction zone. With excessive amounts present therein the desired reaction may be accompanied by various side reactions which decrease the yield of desired products and ultimately increase the catalyst consumption per unit of charge converted. This increased catalyst consumption results from the formation of catalyst-hydrocarbon complexes commonly termed "sludges" which occur during the reaction and particularly so if a large excess of the catalyst is present. In recent years processes have been developed employing a bulk supply zone to which a portion or, in some cases, the entire charging stock is passed to dissolve a portion of the catalyst charge and the resulting solution is introduced into the reaction zone, thereby maintaining catalyst activity during the operation. In these processes the reaction zones ordinarily contain some retaining medium such as a solid packing or a liquid retaining medium, such as a fluid hydrocarbon-catalyst complex, to retain a portion of the catalyst introduced therein. By operating in this manner only a small amount of catalyst is present at any one time.

One of the principal difficulties encountered in the operation described above has been that some reaction has occurred between the hydrocarbon charge and the catalyst in the bulk supply zone, forming a complex charge which not only materially increases the catalyst consumption, but interferes with the formation of a solution of catalyst and hydrocarbon because the complex forms a less soluble coating around the catalyst particles, preventing contact between the hydrocarbon charge and the catalyst.

It is an object of the present invention to provide a method whereby the formation of hydrocarbon-catalyst complex in the bulk supply zone is substantially decreased. It is a further object of the present invention to provide a process for hydrocarbon conversion operations which are truly continuous and in which the rate of conversion may be maintained substantially constant throughout the operation.

In one embodiment the present invention comprises a process for effecting organic chemical reactions in the presence of a Friedel-Crafts type metal halide catalyst which comprises contacting a bulk supply of catalyst with the hydrocarbon charge in liquid phase in the presence of an organoaluminum compound, introducing the resulting solution into a reaction zone maintained under conversion conditions of temperature and pressure and therein effecting the conversion of the hydrocarbon charge in the presence of catalyst introduced into the reaction zone in solution in said charge.

I have discovered that the presence of small amounts of organoaluminum compounds, particularly organoaluminum halides, in the catalyst supply zone inhibits the decomposition reactions which are ordinarily encountered in said zone and thereby prevent to a large extent the formation of hydrocarbon-catalyst complexes which interfere with the satisfactory operation of the process. Athough the exact reason for the inhibiting effect is not known, the effect is substantial as shown by examples included hereinafter in this specification.

The organoaluminum compounds employed in my invention comprise the compounds having the formula $R_nAlX_{3-n}$ wherein R represents a hydrocarbon radical selected from the group consisting of alkyl and aryl radicals, X representing a halogen selected from the group consisting of chlorine or bromine and iodine and $n$ represents an integer not greater than 3. Thus, the invention contemplates the use of organoaluminum halides of the type $RAlX_2$ and $R_2AlX$, both of which are readily prepared by several methods. In compounds of the $R_2AlX$ type, the R group may be the same or different, e. g., $(CH_3)(C_2H_5)AlX$. The preferred method of preparation involves the reaction of an alkyl or aryl halide with metallic aluminum according to the following equation:

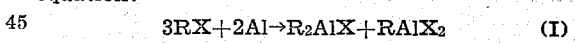
$$3RX + 2Al \rightarrow R_2AlX + RAlX_2 \qquad (I)$$

The equimolecular mixture of organoaluminum compounds formed in this reaction is ordinarily referred to as an alkyl or aryl aluminum sesquihalide.

Although the above reaction is the most desirable method of preparing the organoaluminum compounds, nevertheless, any other method of preparation of these compounds may be employed, e. g., the dihalide type organoaluminum compound is readily prepared by reacting a monohalide or sesquihalide compound with pure aluminum halide according to the following equation:

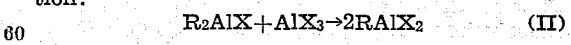
$$R_2AlX + AlX_3 \rightarrow 2RAlX_2 \qquad (II)$$

It is also possible to employ an aluminum-magnesium alloy for reaction with alkyl halides and obtain only the monohalide type organoaluminum compound instead of the mixture or sesquihalide shown in Equation I. The use of the alloy is illustrated by the following equation:

$$(2Al+Mg)+4RX \rightarrow 2R_2AlX+MgX_2 \quad (III)$$

The invention also includes the use of compounds of the type $R_3Al$ where $n=3$ in the formula $R_nAlX_{3-n}$. These aluminum trialkyls and triaryls are somewhat more difficult to prepare and for this reason the organoaluminum halides hereinbefore described are preferred. The R groups in the $R_3Al$ compounds may be the same or different, e. g., $RR'R''Al$ where R, R', and R'' are different alkyl or aryl groups. The $R_3Al$ compounds may be prepared by reacting organoaluminum halides with sodium according to the following equations:

$$(R_2AlX+RAlX_2)+3Na \rightarrow R_3Al+3NaX+Al \quad (IV)$$

$$3R_2AlX+3Na \rightarrow 2AlR_3+3NaX+Al \quad (V)$$

The various procedures for obtaining the organoaluminum compounds employed in the present invention are not necessarily equivalent and it is not intended to limit the invention to any particular method. Details of the methods hereinabove described may be found in an article entitled "Organoaluminum compounds, I. Methods of preparation" by A. V. Grosse and J. M. Mavity, Journal of Organic Chemistry, volume 5, No. 2, pages 106–121 (March 1940) and also in U. S. Patent 2,270,292 issued January 20, 1942, to A. V. Grosse.

The proportion of organoaluminum compound required in the method of this invention is usually small. Amounts as low as 1% by weight of the hydrocarbon charge have been found to be sufficient to effectively inhibit the decomposition reactions. The organoaluminum compound can be introduced into the charge by continuously dissolving a small portion in the hydrocarbon reactants being introduced into the catalyst supply zone.

Although many organoaluminum compounds may be employed in the process of the present invention, it is not intended that these compounds be considered as equivalents. In general, the choice of organoaluminum compounds will depend upon many factors, including the nature of the hydrocarbon conversion reaction being effected, operating conditions employed, availability or ease of preparation of the organoaluminum compound, etc. These compounds are generally liquids or low melting solids and in the pure state must be handled with care since they are extremely reactive, particularly with water, and in many cases are also spontaneously inflammable in the presence of air. However, when an organoaluminum compound is dissolved in relatively small concentrations in a hydrocarbon charging stock as contemplated in one embodiment of the present invention, the high activity of the organoaluminum compound is readily controlled.

The method of my invention finds particular application in reactions involving the alkylation, isomerization, polymerization, cracking or condensation of organic compounds and particularly of hydrocarbons.

The alkylation of paraffinic hydrocarbons, particularly isoparaffins, such as isobutane, isopentane, isohexane, etc., is included within the scope of the present invention. The higher molecular weight homologues of isobutane or other branched chain paraffinic hydrocarbons containing at least one tertiary carbon atom may also be employed. In general, other saturated hydrocarbons such as naphthenes including cycloparaffins and alkylcycloparaffins may also be alkylated under conditions generally applicable to the alkylation of paraffins. The invention is also applicable to the alkylation of unsaturated cyclic compounds such as aromatics and particularly aromatic hydrocarbons. The aromatic hydrocarbons which may be employed include both the mononuclear aromatics such as benzene, toluene, and other alkyl benzenes and also the polynuclear aromatics such as naphthalene, anthracene, etc.

Generally, olefinic hydrocarbons are the preferred alkylating agents for the alkylation of the aliphatic or cyclic hydrocarbons. These olefins may include the aliphatic normally gaseous olefins such as ethylene, propylene, and butylene and also the normally liquid olefins such as hexylene, etc. including polymers of the lower boiling olefins. Cyclic olefins such as cyclohexene, diolefins such as butadiene and isoprene, and also the non-conjugated diolefins and other poly-olefins may also be employed as alkylating agents particularly for the aromatic hydrocarbons. It is to be understood, however, that the various classes of olefins are not necessarily equivalent in their action as alkylating agents. Moreover, within any given class of olefinic alkylating agents the separate members of the class are also not necessarily equivalent, e. g., in the class of monoolefinic hydrocarbons, ethylene or propylene being the lowest members of the series may require different operating conditions than are required in the case of butylene or other more reactive higher molecular weight members of the series.

In the case of aromatics, other alkylating agents such as alcohols, ethers, esters, alkyl halides, etc. may be employed instead of the olefinic hydrocarbons. Again it should be noted that the use of these compounds as alkylating agents is not to be construed as being on an equivalent basis with the use of olefinic alkylating agents since somewhat different operating conditions may be necessary depending upon the particular reactants, the nature of the catalyst, and upon other factors.

In general, the alkylation reactions may be carried out in the presence of aluminum halide catalysts at a temperature within the range of from about 50° F. to about 250° F. and under a pressure of from substantially atmospheric to approximately 50 atmospheres or more. The pressure should be sufficiently high to maintain a substantial proportion of the hydrocarbons in the liquid phase. It is also desirable to have an excess of the isoparaffinic, naphthenic, or aromatic compound over the alkylating agent in order to insure that the alkylation reaction will predominate over other side reactions such as polymerization, etc.

Another important hydrocarbon conversion reaction to which the present invention is readily applied, is the isomerization of saturated hydrocarbons including normally gaseous and normally liquid paraffins and the naphthenic or cycloparaffinic hydrocarbons. The conversion of paraffin hydrocarbons of straight chain or mildly branched structure into compounds of a more highly branched character is of great importance in the petroleum industry. Normal butane is readily converted to the more reactive isobutane useful in alkylation reactions, and the normally liquid paraffins such as those found in straight run fractions may be converted to branched chain isomers thereof which possess considerably higher antiknock values. These isomerization reactions are generally conducted at a temperature within the range of from about 50° F. to about 350° F. and at a pressure of from about atmospheric to 50 atmospheres or more. The particular temperature to be employed in a given case will, of course, depend upon the charging stock and upon other factors. A hydrogen halide activator is employed and in some cases hydrogen may also have a beneficial effect.

In order to illustrate the invention more fully, reference is now made to the drawing which illustrates the isomerization of normal pentane to isopentane as effected according to the method of the present invention.

Referring to the drawing, normal pentane is introduced through line 1 containing valve 2 into pump 3 which discharges through line 4 and valve 5 into catalyst supply chamber 6. Regulated amounts of an organoaluminum compound are introduced into the system through line 7 containing valve 8 into the suction of pump 9 and line 10 containing valve 11 into the charge stream entering supply chamber 6. Some of the organoaluminum compounds may not be liquid under ordinary conditions of temperatures and pressures. However, in these cases, the organoaluminum compounds may be heated under pressure to liquefy them and then handled in a manner similar to the liquid compounds. The quantity of this organoaluminum compound added to the hydrocarbon stream is, of course, dependent upon the amount necessary in catalyst supply chamber 6 to prevent decomposition of the normal pentane therein.

Catalyst supply chamber 6 will contain a metal halide catalyst of the Friedel-Crafts type such as aluminum chloride, zinc chloride, etc., which may be present in a finely divided or granular state through which the solution of normal pentane and organoaluminum compound is passed. During the passage of this solution through the catalyst supply chamber, a quantity of the catalyst is dissolved therein and thereafter introduced into a reaction chamber wherein at least a portion of the normal pentane is converted to isopentane in the presence of the catalyst introduced by said solution and added hydrogen halide. It is obvious from the previous description that catalyst supply chamber 6 is operated under sufficient pressure to maintain the normal pentane in substantially liquid phase during its passage through the chamber. This pressure will, of course, vary with the temperatures employed. The range of temperatures which may be satisfactorily utilized will be dependent to a large extent upon the type of catalyst employed and the catalyst concentration desired in the reaction zone. This temperature will ordinarily be of the order of 100° to 300° F., preferably about 150° to 220° F.

Another means which may be employed for controlling the amount of catalyst removed from the supply chamber 6 is the by-passing of regulated portions of the charge through line 12 containing valve 13. Excellent control of the catalyst addition may also be obtained by varying the temperature of the charge entering supply chamber 6 thereby changing the solubility of the catalyst in the charge.

Although only a single supply tower and chamber containing organoaluminum compounds is shown in the drawing, it is ordinarily advisable to employ at least two of these chambers so that the process may be more truly continuous and that one set of chambers may be employed while the other set is being cleaned and refilled with catalyst and organoaluminum compounds.

The effluent from catalyst supply chamber 6 containing metal halide catalysts and the organoaluminum compounds dissolved therein leave chamber 6 through line 14 containing valve 15 and are commingled in reactor 16 with a hydrogen halide obtained as hereinafter set forth and a substantial portion of the normal pentane charge isomerized to isopentane in the presence of the catalyst introduced through line 14.

When the normal pentane containing the metal halide catalyst and organoaluminum halide dissolved therein are commingled with the hydrogen halide a reaction occurs and the organoaluminum halide is converted to the halogen halide as illustrated by the following equation where the organoaluminum compound comprises the dihalide:

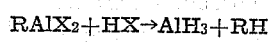

$$RAlX_2 + HX \rightarrow AlH_3 + RH$$

Because of this reaction it is necessary when treating hydrocarbons having a tendency to decompose in the reaction zone in the presence of the metal halide catalyst to add materials which will inhibit the decomposition. Materials which have been found effective, particularly in isomerization, are hydrogen, small amounts of aromatics such as benzene, toluene, xylenes, etc. in concentrations of about 0.05 to 5% by volume of the charge and cycloparaffins such as cyclohexane, methylcyclopentane, methylcyclohexane and similar cycloparaffins in concentrations of about 0.5 to about 20% by volume of the charge.

In the specific operation described herein, namely the isomerization of normal pentane, a small amount of benzene (about 0.5% by volume) is introduced through line 68 containing valve 69 into line 14 wherein it is commingled with the charge and passes into reactor 16.

Reactor 16 may comprise a large cylindrical chamber containing a solid packing material such as quartz chips, beryl saddles, stoneware Raschig rings, crushed fire-brick, pumice, granular or pelleted particles of silica, alumina or silica-alumina composites, activated charcoal and various other packing materials well known to those skilled in the art. These packing materials provide surfaces which retain a portion of the catalyst introduced into reactor 16 in the hydrocarbon stream and thereby maintain a high catalyst concentration throughout the operation. Alternatively, other means may be employed for the retention of the catalyst. For example, the liquid complex of aluminum chloride and hydrocarbons may be disposed within reactor 16 and the catalyst-containing stream passed upwardly through the retaining body of complex. Usually, if a liquid retaining medium is employed, the reactor comprises an apparatus whereby efficient contacting may be obtained. For example, turbomixers, Stratford contactors or other forms of time tanks may be employed to give satisfactory results. However, for the purpose of the present description the flow will be limited to the passage of the catalyst-containing hydrocarbon charge through a packed reaction vessel.

The conditions of temperature and pressure employed within reactor 16 to effect the conversion of the normal pentane will be dependent to some extent upon the concentration of hydrogen halide within said zone and the catalyst employed. With aluminum chloride and hydrogen chloride, the concentration of the latter will be within the range of about 2 to about 20 mol per cent of the hydrocarbon charge and the temperature will ordinarily be within the range of about 100 to about 250° F. and preferably within the range of about 160 to 220° F.

The conversion products leave reactor 16 through line 17 containing valve 18 and are directed into fractionator 19 wherein an overhead product containing substantially all of the isopentane, hydrogen halide and most of the normal pentane is separated from a bottom product containing the small percentage of higher boiling materials formed during the isomerization reaction and a small proportion of the unconverted normal pentane charge, said mixture having dissolved therein the catalyst removed from reactor 16 in solution in the stream of conversion products withdrawn through line 17.

The bottoms product of fractionator 19 is withdrawn through line 20, directed through valve 21 into the suction side of pump 22 which discharges through line 23 containing valve 24 into line 14, thereby providing a means for recycling a major portion of the catalyst withdrawn from the reaction zone during the operation. This method of operating increases the effective utilization of the catalyst and, as a result, increases the yield of isopentane per pound of catalyst consumed. During the isomerization reaction a small percentage of higher boiling hydrocarbons is formed. To prevent a build-up of these higher boiling hydrocarbons in the system, a portion is withdrawn through line 25 containing valve 26, passed through caustic scrubber 27, line 32, valve 33 into fractionator 34 wherein the normal pentane is separated from the higher boiling materials, the latter compounds being withdrawn from the system, while the normal pentane is recycled through line 37 containing valve 38 through condenser 49 into line 47. Caustic is introduced into scrubber 27 through line 28 containing valve 29 and the spent material withdrawn through line 30 containing valve 31.

The overhead fraction from fractionator 19, comprising normal pentane, isopentane and hydrogen halide, is directed through line 39 containing valve 40 into fractionator 41 wherein the hydrogen halide is separated from the hydrocarbons. The separated hydrogen halide is taken overhead through line 50, valve 51, through condenser 52 into receiver 53 from which it is withdrawn through line 54, valve 55 in the suction side of pump 56 which discharges through line 57 containing valve 58 into reactor 16. The initial charge of hydrogen halide and any make-up hydrogen halide necessary during the operation is introduced through line 59 containing valve 60. Receiver 53 may be vented through line 61 containing valve 62.

A bottoms product from fractionator 41 comprising normal and isopentane is withdrawn through line 42 and valve 43 into fractionator 44 wherein the isopentane is separated from the normal pentane. The separated isopentane is taken overhead through line 45 containing valve 46, passed through the usual condensing and collecting system and recovered as a product of the reaction. Normal pentane is withdrawn through line 47 containing valve 48 into the suction of pump 63 which discharges through line 64 containing valve 65 and is combined with the fresh feed to the plant in line 1.

During the conversion of normal pentane to isopentane in reactor 16, a portion of the catalyst reacts with the hydrocarbon to form a complex commonly termed "sludge." This heavy complex is withdrawn through line 66 containing valve 67 and may be further utilized as a catalyst or may be treated by various means such as hydrogenation to recover the catalyst contained therein.

The following examples illustrate the improved results obtained when operating in accordance with the present invention. However, it is not intended that this invention be limited to the specific conditions of operation hereinafter set forth in said examples.

*Example I*

A normal pentane charge is heated to a temperature of about 180° F. and is passed through a chamber containing a bed of granular aluminum chloride. The effluent from this chamber is introduced into a reaction zone along with about 10 mol per cent of hydrogen chloride and 1 mol per cent of benzene. The reaction zone is maintained at a temperature of about 190° F. under a pressure of 300 pounds per square inch. The reaction products are cooled and condensed and collected in a receiver from which a representative sample is periodically withdrawn. The analysis of the product is as follows:

|  | Per cent |
|---|---|
| Propane | 1.0 |
| Normal butane | 5.6 |
| Isobutane | 9.8 |
| Isopentane | 34.6 |
| Normal pentane | 41.2 |
| $C_6$ and higher | 7.8 |
|  | 100.0 |

A substantial proportion of the aluminum chloride in the catalyst supply tower is converted to a dark viscous liquid lower layer and represents a considerable loss in the aluminum chloride charged to the chamber.

*Example II*

When repeating Example I, using the same conditions of temperature and pressure, the only change in the procedure being that the normal pentane charge contains approximately 0.1% by weight of methyl aluminum sesquichloride, very little sludge formation occurs. The analysis of the product is as follows:

|  | Per cent |
|---|---|
| Normal and isobutane | 1.8 |
| Isopentane | 56.2 |
| Normal pentane | 39.4 |
| $C_6$ and higher | 2.6 |
|  | 100.0 |

The aluminum chloride in the catalyst supply zone is still in granular form with no evidence of the formation of the aluminum chloride hydrocarbon complex.

It is apparent in comparing the results from the above examples that the addition of the organoaluminum halide exerts a considerable influence upon the decomposition reactions in the saturator and provides a method for satisfactorily inhibiting these reactions, thereby making the commercial operation more feasible.

I claim as my invention:

1. In the conversion of hydrocarbons wherein the hydrocarbons are subjected to conversion conditions in a reaction zone in the presence of a Friedel-Crafts metal halide catalyst and wherein at least a portion of the hydrocarbons to be converted is contacted in liquid phase with a bulk supply of the metal halide catalyst to dissolve metal halide catalyst therein and the resultant solution of metal halide in liquid hydrocarbon reactant supplied to the reaction zone, the improvement which comprises adding to said portion of the hydrocarbons, prior to the contact thereof with said bulk supply of the catalyst, a relatively small amount of an organoaluminum compound having the formula $R_nA'X_{3-n}$ wherein R represents a hydrocarbon radical selected from the group consisting of alkyl and aryl radicals, X a halogen selected from the group consisting of chlorine, bromine and iodine and $n$ is an integer not greater than 3.

2. In the conversion of hydrocarbons wherein the hydrocarbons are subjected to conversion conditions in a reaction zone in the presence of an aluminum halide catalyst and wherein at least a portion of the hydrocarbons to be converted is contacted in liquid phase with a bulk supply of aluminum halide to dissolve a portion of the latter and the resultant solution of aluminum halide in liquid hydrocarbon reactant supplied to the reaction zone, the improvement which comprises adding to said portion of the hydrocarbons, prior to the contact thereof with said bulk supply, a relatively small amount of an organoaluminum halide having the formula $R_nAlX_{3-n}$ wherein R represents a hydrocarbon radical selected from the group consisting of alkyl and aryl radicals, X a halogen selected from the group consisting of chlorine, bromine and iodine and $n$ is an integer not greater than 3.

3. In the isomerization of an isomerizable saturated hydrocarbon wherein the hydrocarbon is subjected to isomerizing conditions in a reaction zone in the presence of a Friedel-Crafts metal halide catalyst and wherein at least a portion of the hydrocarbon to be isomerized is contacted in liquid phase with a bulk supply of the metal halide catalyst to dissolve metal halide catalyst therein and the resultant solution of metal halide in liquid hydrocarbon supplied to the reaction zone, the improvement which comprises adding to said portion of the hydrocarbon, prior to the contact thereof with said bulk supply of the catalyst, a relatively small amount of an organoaluminum compound having the formula $$R_nAlX_{3-n}$$

wherein R represents a hydrocarbon radical selected from the group consisting of alkyl and aryl radicals, X a halogen selected from the group consisting of chlorine, bromine and iodine and $n$ is an integer not greater than 3.

4. In the isomerization of an isomerizable saturated hydrocarbon wherein the hydrocarbon is subjected to isomerizing conditions in a reaction zone in the presence of an aluminum halide catalyst and wherein at least a portion of the hydrocarbon to be isomerized is contacted in liquid phase with a bulk supply of aluminum halide to dissolve a portion of the latter and the resultant solution of aluminum halide in liquid hydrocarbon supplied to the reaction zone, the improvement which comprises adding to said portion of the hydrocarbon, prior to the contact thereof with said bulk supply, a relatively small amount of an organoaluminum halide having the formula $R_nAlX_{3-n}$ wherein R represents a hydrocarbon radical selected from the group consisting of alkyl and aryl radicals, X a halogen selected from the group consisting of chlorine, bromine and iodine and $n$ is an integer not greater than 3.

5. In the alkylation of an alkylatable saturated hydrocarbon wherein the hydrocarbon is reacted with an alkylating agent in a reaction zone in the presence of a Friedel-Crafts metal halide catalyst and wherein at least a portion of the hydrocarbon to be alkylated is contacted in liquid phase with a bulk supply of the metal halide catalyst to dissolve metal halide catalyst therein and the resultant solution of metal halide in liquid hydrocarbon supplied to the reaction zone, the improvement which comprises adding to said portion of the hydrocarbon, prior to the contact thereof with said bulk supply of the catalyst, a relatively small amount of an organoaluminum compound having the formula $R_nAlX_{3-n}$ wherein R represents a hydrocarbon radical selected from the group consisting of alkyl and aryl radicals, X a halogen selected from the group consisting of chlorine, bromine and iodine and $n$ is an integer not greater than 3.

6. In the alkylation of an alkylatable saturated hydrocarbon wherein the hydrocarbon is reacted with an alkylating agent in a reaction zone in the presence of an aluminum halide catalyst and wherein at least a portion of the hydrocarbon to be alkylated is contacted in liquid phase with a bulk supply of aluminum halide to dissolve a portion of the latter and the resultant solution of aluminum halide in liquid hydrocarbon supplied to the reaction zone, the improvement which comprises adding to said portion of the hydrocarbon, prior to the contact thereof with said bulk supply, a relatively small amount of an organoaluminum halide having the formula $R_nAlX_{3-n}$ wherein R represents a hydrocarbon radical selected from the group consisting of alkyl and aryl radicals, X a halogen selected from the group consisting of chlorine, bromine and iodine and $n$ is an integer not greater than 3.

7. The improvement as defined in claim 1 further characterized in that the organoaluminum compound is a dihalide.

8. The improvement as defined in claim 1 further characterized in that $n$ equals 2 whereby the organoaluminum compound has the formula $R_2AlX$.

9. The improvement as defined in claim 1 further characterized in that $n$ equals 3 whereby the organoaluminum compound has the formula $R_3Al$.

JULIAN M. MAVITY.

REFERENCES CITED

The following references are of record in the file of this patent:

UNITED STATES PATENTS

| Number | Name | Date |
| --- | --- | --- |
| 2,057,432 | Ipatieff, et al. | Oct. 13, 1936 |
| 2,270,292 | Grosse | Jan. 20, 1942 |
| 2,271,956 | Ruthruff | Feb. 3, 1942 |
| 2,342,123 | Danforth | Feb. 22, 1944 |
| 2,342,124 | Danforth | Feb. 22, 1944 |
| 2,301,615 | Chenicek, et al. | Nov. 10, 1942 |
| 2,277,022 | McMillan, et al. | Mar. 17, 1942 |
| 2,354,851 | Danforth | Aug. 1, 1944 |
| 2,243,406 | Dryer | Mar. 7, 1944 |
| 2,342,922 | Danforth | Feb. 29, 1944 |

Certificate of Correction

Patent No. 2,418,419. April 1, 1947.

JULIAN M. MAVITY

It is hereby certified that error appears in the printed specification of the above numbered patent requiring correction as follows: Column 6, line 24, for that portion of the formula reading "$AlH_3$" read $AlX_3$; and that the said Letters Patent should be read with this correction therein that the same may conform to the record of the case in the Patent Office.

Signed and sealed this 24th day of June, A. D. 1947.

[SEAL]

LESLIE FRAZER,
*First Assistant Commissioner of Patents.*